(12) United States Patent
Goodwyn, Jr.

(10) Patent No.: US 12,389,878 B2
(45) Date of Patent: Aug. 19, 2025

(54) SUPPORT SYSTEM

(71) Applicant: HPBC, LLC., Colonial Heights, VA (US)

(72) Inventor: Lee Goodwyn, Jr., Colonial Heights, VA (US)

(73) Assignee: HPBC, LLC., Colonial Heights, VA (US)

( * ) Notice: Subject to any disclaimer, the term of this patent is extended or adjusted under 35 U.S.C. 154(b) by 14 days.

(21) Appl. No.: 18/244,690

(22) Filed: Sep. 11, 2023

(65) Prior Publication Data

US 2024/0081275 A1  Mar. 14, 2024

Related U.S. Application Data

(60) Provisional application No. 63/461,944, filed on Apr. 26, 2023, provisional application No. 63/409,789, filed on Sep. 25, 2022, provisional application No. 63/405,400, filed on Sep. 10, 2022.

(51) Int. Cl.
*A01K 5/01* (2006.01)
*A01K 15/02* (2006.01)

(52) U.S. Cl.
CPC ............ *A01K 5/0114* (2013.01); *A01K 15/02* (2013.01)

(58) Field of Classification Search
CPC ....... A01K 5/0114; A01K 15/02; A44C 5/003
USPC ......................................... 224/218, 222, 267
See application file for complete search history.

(56) References Cited

U.S. PATENT DOCUMENTS

| 281,638 | A | * | 7/1883 | Mahar | ....................... A45F 5/00 |
| | | | | | 224/218 |
| 1,139,942 | A | * | 5/1915 | Wightman et al. | .... B43M 11/04 |
| | | | | | 223/109 R |
| 2,064,523 | A | * | 12/1936 | Deutcher | ............. A01D 46/247 |
| | | | | | 224/218 |

(Continued)

FOREIGN PATENT DOCUMENTS

| CN | 202958410 U | 6/2013 |
| CN | 206851692 U | 1/2018 |

(Continued)

OTHER PUBLICATIONS

Enjoy-A-Bowl, https://enjoyabowlproducts.com/bowls/.

*Primary Examiner* — Joshua J Michener
*Assistant Examiner* — Nicole Paige MacCrate
(74) *Attorney, Agent, or Firm* — George Likourezos; Carter, DeLuca & Farrell LLP (57) ABSTRACT

A feeding support system includes an inner body and an outer body. The inner body includes a retaining member and an access member. The retaining member is configured to house an object. The retaining member includes an inner wall. The access member has at least one opening configured to enable access to the object housed within the retaining member. The access member is formed within the retaining member. The outer body includes a fastening member, a bonding member, and a protective member. The fastening member is configured to fasten the outer body to a user's appendage. The fastening member has a handle and a strap. The bonding member has an outer lip. The bonding member is configured to fasten the outer body to the user's appendage. The bonding member creates a seal between the outer body and the user's appendage.

20 Claims, 5 Drawing Sheets

(56) References Cited

U.S. PATENT DOCUMENTS

| | | | | |
|---|---|---|---|---|
| 2,364,814 | A | * | 12/1944 | Plummer .................. A63F 9/001 273/284 |
| 4,246,944 | A | * | 1/1981 | Dixie ..................... A01D 46/22 224/217 |
| 4,821,932 | A | * | 4/1989 | Petryshyn .................. A45F 5/00 156/259 |
| 4,863,033 | A | | 9/1989 | Buj |
| 5,020,710 | A | * | 6/1991 | Meszaros ............... A01D 46/22 224/217 |
| 5,105,768 | A | * | 4/1992 | Johnson ................. A01K 7/005 119/72 |
| 5,222,643 | A | * | 6/1993 | Platt ....................... A45D 34/04 224/148.7 |
| 5,335,624 | A | | 8/1994 | Baxter et al. |
| 5,351,866 | A | * | 10/1994 | Foss ....................... A61M 5/008 D9/434 |
| 5,513,597 | A | | 5/1996 | Pollock |
| 5,669,525 | A | * | 9/1997 | Sapyta ................... A01K 5/008 220/904 |
| 5,782,035 | A | | 7/1998 | Locke et al. |
| 6,138,608 | A | | 10/2000 | Mosley |
| 6,743,071 | B1 | | 6/2004 | Tronca |
| 6,780,079 | B2 | * | 8/2004 | Musacchia, Jr. .... A01M 31/004 224/267 |
| 6,923,485 | B1 | * | 8/2005 | Bauswell .............. E04G 21/005 294/3.5 |
| 7,634,973 | B1 | | 12/2009 | Cribb et al. |
| 7,832,355 | B2 | | 11/2010 | Mills |
| 7,832,362 | B2 | | 11/2010 | DeGhionno |
| 7,861,676 | B2 | | 1/2011 | Kates |
| 7,878,148 | B2 | | 2/2011 | Swenson et al. |
| 7,987,816 | B1 | * | 8/2011 | Walsh ..................... B25G 1/04 119/61.5 |
| 8,516,975 | B2 | | 8/2013 | Becattini, Jr. et al. |
| 8,904,960 | B2 | | 12/2014 | O'Connor |
| 8,997,692 | B2 | | 4/2015 | Lipscomb et al. |
| 9,027,771 | B2 | | 5/2015 | Metcalfe et al. |
| D749,274 | S | | 2/2016 | Gailen |
| 9,260,223 | B2 | | 2/2016 | Kim et al. |
| 9,485,961 | B2 | | 11/2016 | Briski |
| 9,585,366 | B2 | | 3/2017 | Ault et al. |
| 9,943,159 | B1 | * | 4/2018 | Novikova ............. A45D 40/22 |
| 9,949,460 | B2 | | 4/2018 | Austin |
| 10,517,267 | B2 | | 12/2019 | Gordon et al. |
| 10,660,305 | B2 | | 5/2020 | Bales et al. |
| 10,674,702 | B2 | | 6/2020 | Gibbs |
| 10,779,507 | B2 | | 9/2020 | Pietrocarlo et al. |
| 10,849,312 | B2 | | 12/2020 | Hill |
| 10,945,411 | B2 | | 3/2021 | MacNeil et al. |
| 10,959,402 | B2 | | 3/2021 | Price |
| 11,224,202 | B2 | | 1/2022 | Baxter et al. |
| 11,382,306 | B2 | | 7/2022 | McKinnon et al. |
| 11,497,193 | B2 | | 11/2022 | Yim et al. |
| 11,910,943 | B2 | * | 2/2024 | König .................... A47G 19/10 |

| | | | | |
|---|---|---|---|---|
| 2002/0083900 | A1 | * | 7/2002 | Williams ............. A01K 5/0114 119/51.01 |
| 2002/0134313 | A1 | | 9/2002 | Andrew King et al. |
| 2006/0042549 | A1 | | 3/2006 | Bauman |
| 2006/0207513 | A1 | * | 9/2006 | Carroll ...................... A01K 5/00 119/57.91 |
| 2007/0181068 | A1 | | 8/2007 | McKeown |
| 2008/0163820 | A1 | | 7/2008 | Bennett |
| 2009/0056640 | A1 | | 3/2009 | Gross |
| 2010/0083904 | A1 | | 4/2010 | Pu et al. |
| 2010/0089327 | A1 | | 4/2010 | Gross |
| 2011/0297090 | A1 | | 12/2011 | Chamberlain et al. |
| 2012/0298676 | A1 | | 11/2012 | Cooks |
| 2014/0132044 | A1 | | 5/2014 | Louie |
| 2014/0315162 | A1 | | 10/2014 | Ehrenkranz |
| 2015/0069096 | A1 | * | 3/2015 | Kampas .................... A45F 5/00 224/148.6 |
| 2015/0076257 | A1 | * | 3/2015 | Mauer ................. A01M 31/008 239/653 |
| 2015/0182008 | A1 | * | 7/2015 | Kattouf, II ................ A45F 5/00 224/222 |
| 2016/0165838 | A1 | * | 6/2016 | Chubeck .............. A01K 5/0114 119/61.56 |
| 2017/0042116 | A1 | | 2/2017 | Lindskov et al. |
| 2017/0071155 | A1 | | 3/2017 | Gailen et al. |
| 2018/0168126 | A1 | | 6/2018 | Gibbs |
| 2018/0228128 | A1 | | 8/2018 | Gibbs |
| 2018/0263858 | A1 | * | 9/2018 | Williams ................ A61J 17/02 |
| 2018/0325079 | A1 | | 11/2018 | Gailen et al. |
| 2018/0343827 | A1 | | 12/2018 | Hong |
| 2018/0343829 | A1 | | 12/2018 | Hong |
| 2019/0090669 | A1 | | 3/2019 | O'Hara |
| 2019/0216052 | A1 | | 7/2019 | Yang et al. |
| 2021/0127632 | A1 | | 5/2021 | Price |
| 2021/0345582 | A1 | | 11/2021 | Yoo et al. |
| 2022/0007796 | A1 | * | 1/2022 | Jadhav .................... A44C 5/003 |
| 2022/0330520 | A1 | * | 10/2022 | Namerow ............ A01K 5/0107 |
| 2023/0200473 | A1 | * | 6/2023 | Lima ...................... A01K 15/02 2/159 |
| 2023/0354773 | A1 | * | 11/2023 | Yang ..................... A45C 7/0063 |

FOREIGN PATENT DOCUMENTS

| | | |
|---|---|---|
| CN | 111642415 A | 9/2020 |
| EP | 3656212 A1 | 5/2020 |
| FR | 2477369 A1 | 9/1981 |
| IN | 1469/DEL/2013 | 4/2014 |
| JP | 6831278 B2 | 2/2021 |
| JP | 7162633 B2 | 10/2022 |
| KR | 102428823 B1 | 8/2022 |
| KR | 20220144752 A | 10/2022 |
| TW | M356380 U | 5/2009 |
| WO | 2019070425 A1 | 4/2019 |
| WO | 2020130759 A1 | 6/2020 |
| WO | 2022096535 A1 | 5/2022 |

* cited by examiner

SUPPORT SYSTEM

CROSS-REFERENCE TO RELATED APPLICATIONS

This application claims the benefit of, and priority to, U.S. Provisional Patent Application No. 63/405,400, filed on Sep. 10, 2022, U.S. Provisional Patent Application No. 63/409,789, filed on Sep. 25, 2022, and U.S. Provisional Patent Application No. 63/461,944, filed on Apr. 26, 2023, which are hereby incorporated by reference herein.

TECHNICAL FIELD

The present disclosure relates generally to support systems, and more particularly, to feeding support systems that enable users to provide support to living beings such as animals for training, bonding, intake encouragement and/or intake reduction purposes.

BACKGROUND

Animals have been companions to humans since the beginning of time; dogs are often nicknamed "man's best friend." Therefore, many animal owners desire ways to bond with their animals. Sometimes, such animals can become malnourished and/or dehydrated, endangering their health. This can occur for many reasons, including lack of appetite for food/water, disliking a particular type of food/water, not feeling comfortable in their environment where they are expected to drink/eat, having a prior bad experience while consuming, sickness, etc. Animal owners desire ways to encourage their animal companions to eat/drink while bonding with them, as it is important for animals to be fed and hydrated to remain healthy.

Accordingly, there exists a need for a system that encourages a living being to eat and/or drink to maintain their health, while simultaneously allowing them to bond with their human companion.

SUMMARY

A feeding support system includes an inner body and an outer body. The inner body includes a retaining member and an access member. The retaining member is configured to house an object. The retaining member includes an inner wall. The access member has at least one opening configured to enable access to the object housed within the retaining member. The access member is formed within the retaining member. The outer body includes a fastening member, a bonding member, and a protective member. The fastening member is configured to fasten the outer body to a user's appendage. The fastening member has a handle and a strap. The bonding member has an outer lip. The bonding member is configured to fasten the outer body to the user's appendage. The bonding member creates a seal between the outer body and the user's appendage. The protective member has an outer wall. The protective member configured to shield at least a portion of the user's appendage and covers the access member.

BRIEF DESCRIPTION OF THE DRAWINGS

A better understanding of the features and advantages of the present disclosure will be obtained by reference to the following detailed description that sets forth illustrative aspects, in which the principles of the present disclosure are utilized, and the accompanying drawings of which.

DETAILED DESCRIPTION

Aspects of the present disclosure are described in detail with reference to the drawings, wherein like reference numerals identify similar or identical elements.

Although the present disclosure will be described in terms of specific aspects, it will be readily apparent to those skilled in this art that various modifications, rearrangements, and substitutions may be made without departing from the spirit of the present disclosure. The scope of the present disclosure is defined by the claims appended hereto. For purposes of promoting an understanding of the principles of the present disclosure, reference will now be made to exemplary aspects in the drawings, and specific language will be used to describe the same.

The phrases "in an aspect," "in aspects," "in various aspects," "in some aspects," or "in other aspects" may each refer to one or more of the same or different aspects in accordance with the present disclosure.

The present disclosure includes systems, devices and methods for increasing support to living beings, such as animals, while bonding with and maintaining the animals' health. The support system, device and/or method may encourage the living beings to eat and/or drink to maintain their health, while simultaneously allowing them to bond with their human companions.

As described herein, the support system provides various benefits. First, the system may increase bonding between a user and a living being, such as an owner and a pet animal, respectively. For example, a dog may bond with their owner as the dog consumes food from the owner's hand while using the system. Because the user's hand is accessible through the bowl, the dog may be familiar with the scent of the owner's hand and become more comfortable with the owner as a result. The dog owner may use this same support system to acclimate their dog to other family members and/or friends.

Further, the support system may encourage low level feeding, i.e., feeding at the same or similar height level as the living being. For example, an owner often feeds their dog from a standing position, i.e., a position that is frequently above the dog. With the support system, an owner may be encouraged to sit or position themselves at the same or at a similar height level as their dog while the dog feeds from the support system. In doing so, the owner and dog can further bond as the owner feeds the dog on the dog's level.

The support system may also promote slow feeding. For example, using the support system, when an owner observes their dog eating/drinking too quickly, the owner can throttle feeding by backing away. The owner can hold the support system with one hand while simultaneously using their other hand to signal to the dog to slow down, such as by petting or motioning the dog to stop and/or covering the top bowl of the support system. In doing so, the owner may train the dog to eat/drink slower.

In addition, the support system may train a living being that is averse to bowl-feeding to eat/drink from a bowl via the user's hand. For example, a dog may become more likely to consume from the support system's bowl as they are familiar with their owner's scent, which is present due to the owner's exposed hand. Over time, the dog may subconsciously become acclimated to eating from a normal bowl: The dog can begin by enjoying the material in the support system and the benefits of the exposed hand, then gradually transition to eating from a normal bowl as they become acclimated to doing so. In addition, the owner can retain the benefit of holding more food, water, etc. than with their hand alone, speeding up feedings.

Further, the support system may serve as a safety tool to help shield and/or protect a user's hand during feedings. For example, using the support system, the dog only has access to eat and/or bite what is within the support system. The palm of the user, which lays flat with and/or under the bowl, is not immediately and easily accessible, and therefore is protected from unwanted biting.

Still further, the support system eliminates the need to find a bowl; at least a cup of food and/or water may fit into the support system. The bowl of the support system may be the size, shape and/or configuration of a small container, and/or may be disposable for on-the-go storage and use. For example, a container with pre-packaged water would save a user time and resources over attempting to find a bowl, water and/or food while out for a walk with their dog.

The above benefits of the support system are exemplary illustrations and not limiting examples of usage. For example, the support system is not limited to use for feedings, and may be used for other methods of playtime, bonding, and/or training with an animal. Moreover, the support system is configured for use with various living beings, such as horses, livestock, etc.

As discussed below, various support systems, methods and devices are disclosed, which may use some or all of the disclosed elements in varying configurations, arrangements, etc., and are not limited to the member(s) described in this application and may include more member(s).

Referring to FIGS. 1-4, a support system 100 is shown. The support system 100 generally includes a retain member 100A, a fastener member 100B, and an access member 100C.

Figure 2:
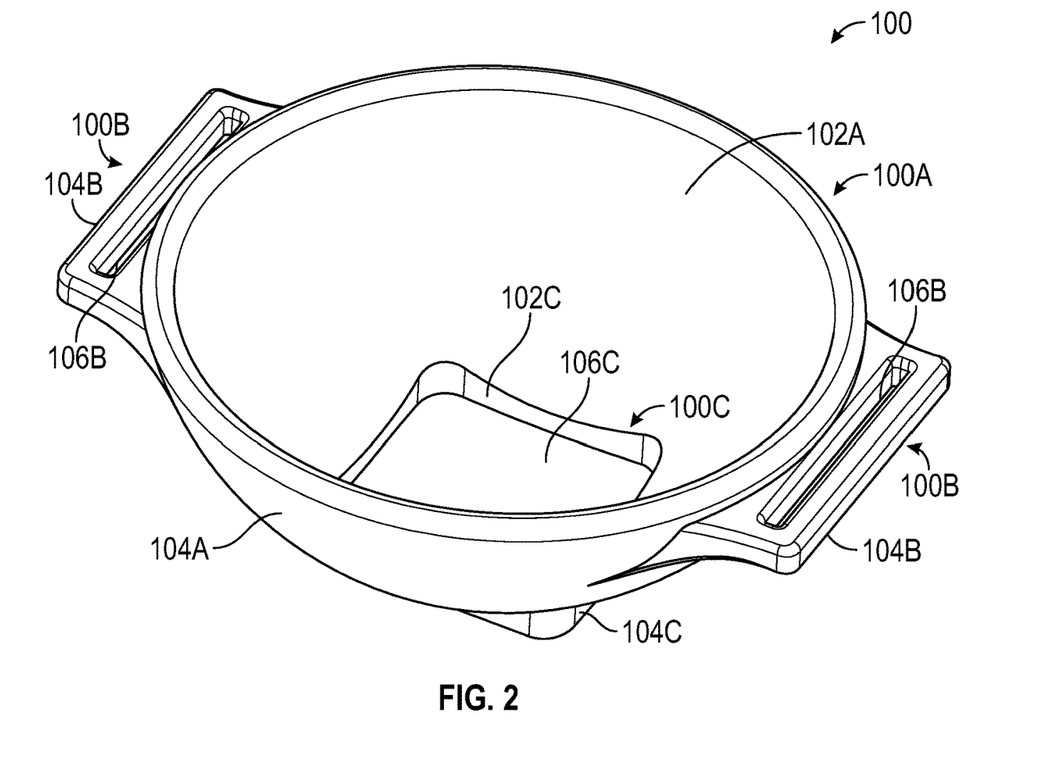
FIG. 2 is top perspective view of the support system of FIG. 1, in accordance with aspects of the present disclosure.

As shown in FIG. 2, the retain member 100A may have an inner surface 102A and an outer surface 104A. The retain member 100A may generally mimic the shape of a bowl, such as a dog food bowl used for feedings, although other configurations are contemplated. In aspects, the shape of retain member 100A may differ based on the intended use, such as a shape that is more ergonomic for the user or animal (e.g., flat plate, square, shaped container, etc.).

The retain member 100A may hold water/food, treats, medicine, etc. within the support system 100 for consumption by a living being (e.g., an animal). In aspects, the retain member 100A may also serve as a protection mechanism for a user. For example, when inserting the user's hand into the support system 100, the user's fingers are shielded by the outer surface 104A of the retain member 100A, therefore preventing the animal from biting the user's hand while using the support system 100.

Figure 3:
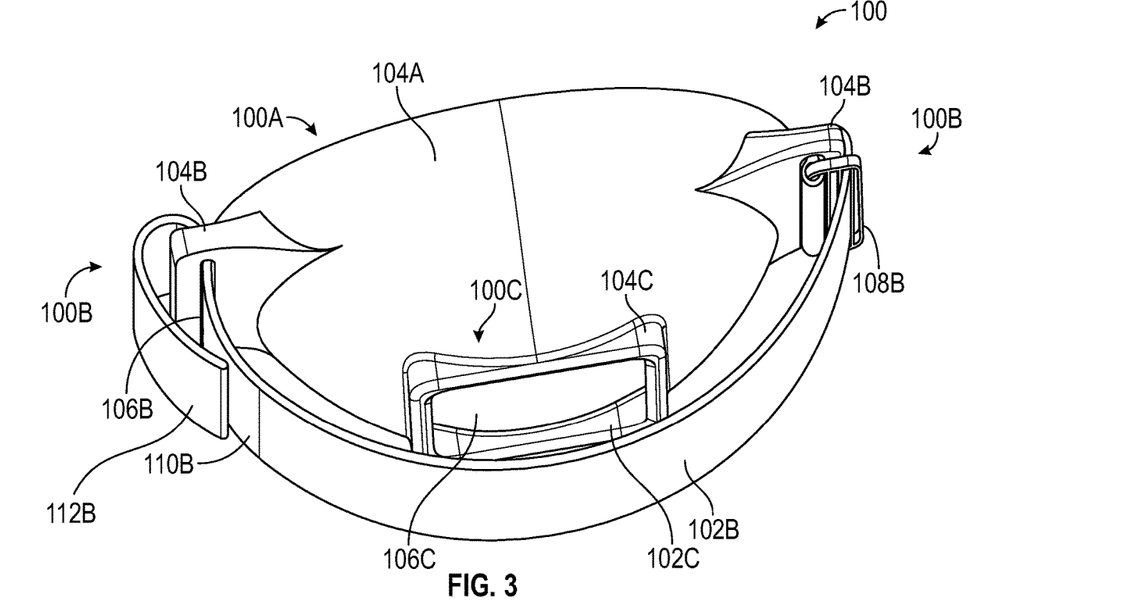
FIG. 3 is a side perspective view of the support system of FIG. 1, in accordance with aspects of the present disclosure.

As shown in FIG. 3, the fastener member 100B generally includes a strap 102B and handles 104B. The strap 102B may be configured to loop through slots 106B of the handles 104B. The strap 102B may be a piece of fabric (e.g., cotton, spandex, elastic) with an attachment mechanism 110B allowing portions of the strap 102B to attach together. The attachment mechanism may be hook-and-pile fasteners, although alternative attachment mechanisms such as buttons, clasps, etc. are envisioned. In aspects, handles 104B may be formed on opposing sides of the retain member 100A, although alterative positions are envisioned. For example, the handles may be removably coupled and/or glued onto the retain member 100A. A hook 108B may be attached to the strap 102B. The hook 108B may be used to pull down on the strap 102B for easy insertion into/removal from the holes 106B and/or the user's hands. In aspects, the hook 108B may operate as a slide-adjuster to alter the size and/or tightness of the strap 102B around the user's hand.

Figure 4:
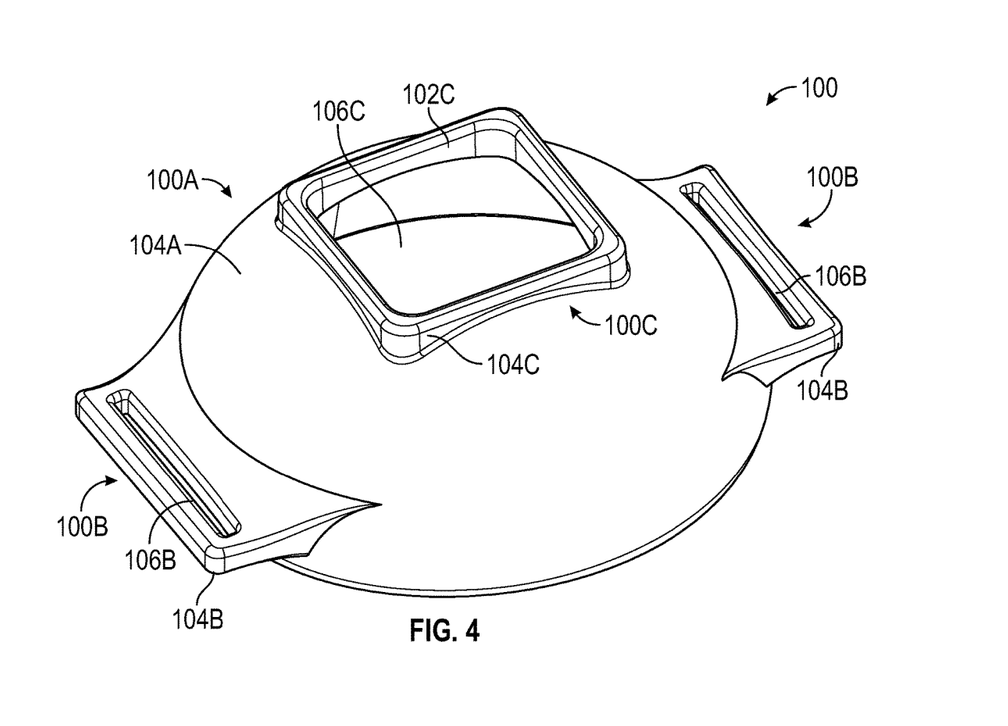
FIG. 4 is a rear perspective view of the support system of FIG. 1, in accordance with aspects of the present disclosure.

As shown in FIGS. 2-4, end portions 112B of the strap 102B may be placed through the holes 106B and the hook 108B. Then, the end portions 112B of the strap 102B may be U-turned to attach to themselves via the attachment mechanism 110B. In aspects, the attachment mechanism 110B may be distributed along an entire length of the strap 102B, although alternative layouts are envisioned, such as distribution along one side or on the end portions 112B of strap 102B. The strap 102B is looped through the handles 104B, which may be used to secure a portion of the user's body (e.g., the user's hand) to the retain member 100A. In aspects, a pair of hooks (not shown) may be inserted into each of the holes 106B, attaching each of the end portions 112B of the strap 102B to the handles 104B. The pair of hooks may be made of metal, plastic, or another durable material.

With further reference to FIGS. 2-4, the access member 100C generally includes walls 102C, 104C, and opening 106C. The walls are formed from a lip or series of lips, which protrude from a rear end of the outer wall 104A of the retain member 100A, and which surround the opening 106C. The walls 102C, 104C may protrude outward at a 90-degree angle from the retain member 100A. As shown in FIGS. 2-4, the access member 100C may include four inner walls 102C and four outer walls 104C, forming and/or bordering a square-shaped opening 106C. Other arrangements are envisioned (e.g., a single circular wall forming a circular opening, or walls forming a rectangular-shaped opening). The access member 100C is formed in a centered, bottom portion of the retain member 100A, although alternative placements for the access member 100C are envisioned, such as on one or more sides of the retain member 100A. In aspects, multiple access members 100C may be present, in varying shapes and/or sizes.

The access member 100C is formed in the retain member 100A, with opening 106C providing access for a feeding animal to smell and/or make contact with the user (e.g., the user's hand/palm). Generally, the access member 100C creates a suction around the hand of the user, forming a tight seal between the user's hand and the retain member 100A. The tight seal will create a barrier between the retain member 100A and the user's hand, which will enable food and/or water to remain within the retain member 100A and reduce/restrict the free flow of the food and/or water through the opening 106C. In doing so, access member 100C acts as part of retain member 100A.

In aspects, access member 100C may be treated as a separate compartment of retain member 100A, where one item (e.g., water or wet food) may be placed within the resulting compartment of access member 100C, and another item (e.g., dry food) may be placed in the remaining, upper portion of the retain member 100A. In doing so, the two different items may remain separated within access member 100A, preventing them from mixing them together. In aspects, an inner surface of the access member 100C may have a raised surface and/or edge (not shown), which can create an additional level of separation and/or compartmentalization within access member 100A.

In aspects, the opening 106C of the access member 100C may have a protective member (not shown) such as a mesh screen, filter, or other device. The protective member may be formed from chicken wire or a mesh-like material, although other materials are contemplated. The protective member serves to add an additional layer of protection and/or retention for the user. For example, the user could expose their hand to the animal with a shield to prevent biting, which may also assist in preventing pieces of food from exiting the opening 106C.

In aspects, the retain member 100A, fastener member 100B, and/or access member 100C may be formed from a silicone or a rubber-like material, which can further enhance the seal between the support system 100 and the user's hand. Alternative materials, such as plastics and polymer/plastic composites, are also contemplated. In aspects, the access member 100C may include an adhesive. The access member 100C may be lined with a rubber O-ring gasket or a rubber O-ring sleeve to further seal the contents within the retain member 100A. In aspects, the retain member 100A and/or the access member 100C may be formed from a metal, such as stainless steel. In doing so, the retain member 100A and/or the access member 100C may be dishwasher compatible.

Figure 1:
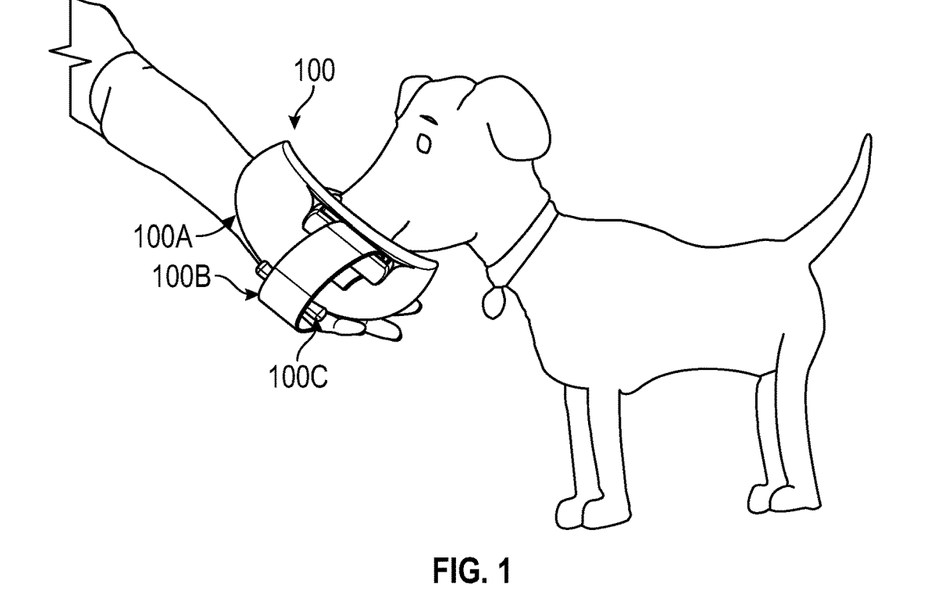
FIG. 1 is an illustration showing an exemplary support system, in accordance with aspects of the present disclosure.

In aspects, the access member 100C may be configured in the shape of/include a plug and/or stopper (not shown). The access member 100C may be formed from silicone, plastic, cork, polymer/plastic composites, or another durable and/or flexible material. This plug configuration may assist in preventing items from exiting the retain member 100A, and/or allowing the user to place their hand on a different portion of the support system In aspects, the plug may be a separate component from the access member 100C and/or designed to have a mating configuration with the access member 100C FIG. 1 shows an exemplary illustration of the support system 100 in use. During use, a user may place their hand (e.g., their palm) under the retain member 100A to connect with the access member 100C. Generally, the user's hand is positioned to cover or overlap the access member 100C. For example, the user could place their hand under the retain member 100A (e.g., bowl) palm side up. Then, after fastening the bowl to their hand with the fastener member 100B, the user could place food and/or water into the retain member 100A for an animal (e.g., a dog) to drink. While the animal eats/drinks, it may also choose to connect with the palm of the user, thereby increasing bonding and support.

Figure 5:
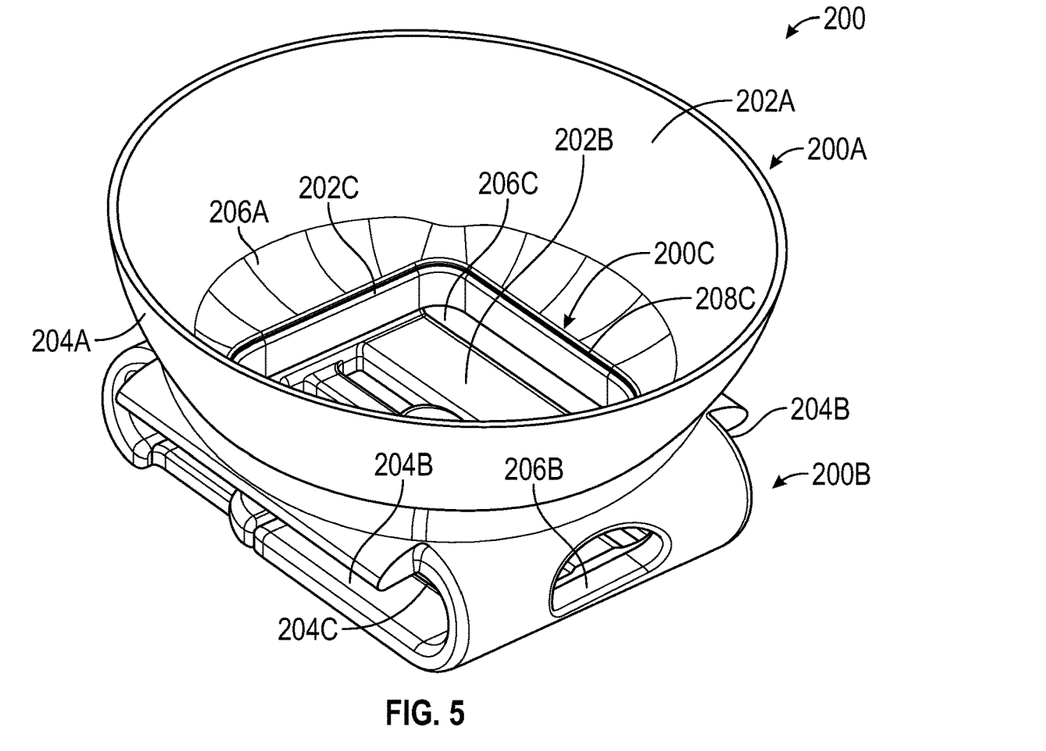
FIG. 5 is a top perspective view of an exemplary support system, in accordance with aspects of the present disclosure.
Figure 6:
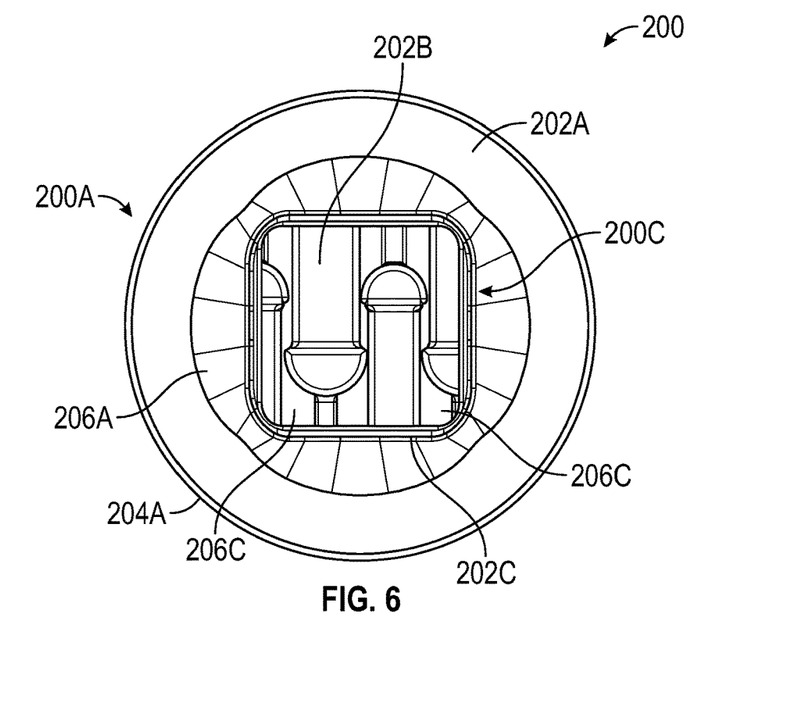
FIG. 6 is a top view of the support system of FIG. 5, in accordance with aspects of the present disclosure.

Referring now to FIGS. 5 and 6, a support system 200 is shown, which discloses features similar to the support system 100. The support system 200 generally includes a retain member 200A, a fastener member 200B, and an access member 200C. Generally, the components of support system 200 (the retain member 200A, the fastener member 200B, and the access member 200C) are integrated and/or formed from a single component, although detachable, independent components are contemplated.

The retain member 200A may have an inner surface 202A and an outer surface 204A. The retain member 200A may generally mimic the shape of a bowl, such as a dog food bowl, used for feedings. In aspects, the shape of retain member 200A may differ based on the intended use, such as a shape that is more ergonomic for the user or animal (e.g., flat plate, square, shaped container, etc.).

The retain member 200A may hold water/food, treats, medicine, etc. within the support system 200 for consumption by a living being (e.g., an animal). In aspects, the retain member 200A may also serve as a protection mechanism for a user. For example, when inserting the user's hand into the support system 200, the user's fingers are shielded by the outer surface 104A of the retain member 200A, therefore preventing the animal from biting the user's hand while using the support system 100.

The fastener member 200B generally includes bands 202B and slots 204B, 206B. The fastener member 200B may be located on a rear portion of the outer wall 104A of the retain member 100A, although alternative placements are contemplated. As discussed above, the fastener member 200B is generally integrated with the retain member 100A as a single unit. The bands 202B wrap around in a U-shape to connect with alternating sides of the retain member 100A, forming a handle-like device for the user to insert an appendage (e.g., their hand) into.

As seen in FIG. 6, the bands 202B may be rectangular shaped, and/or alternating thick and thin bands interconnecting in a parallel fashion, which can provide increased strength and flexibility. The bands 202B may press against the back of the user's hand while their palm is pressed against the access member 200C and/or the retain member 200A, securing the user's hand to the support system 200. In aspects, a hook (not shown) may be attached to the bands 202B. The hook may be used to pull down on the bands 202B for easy insertion of a user's hand into slots 204B, 206B, and/or may operate as a slide-adjuster to alter the tightness and/or size of the bands 202B around the user's hand. Alternative configurations (e.g., crisscross style and/or bands with a uniform/similar thickness along their entire length) are also contemplated and within the scope of this disclosure.

Slots 204B, 206B allow space for a user to insert and/or fasten their hand into the fastener member 200B. Generally, a pair of slots 204B may be larger and present on opposing sides of the fastener member 100B for insertion of the entire user's hand first. The slots 206B may be smaller and present on the remaining two opposing sides of the fastener member for insertion of a user's finger(s) (e.g., their thumb) thereafter. In including slots 204B, 206B on both sides of the fastener member 200B, the user can wear the support system 200 on either their left or right hand, depending on dominance/preference. For example, a user may insert their hand into either one of the larger slots 204B, then insert their thumb into either one of the smaller slots 206B, similar to putting on a glove. Then, the tension, restriction, and/or the friction of the material may cause the support system 200 to bond to the user's hand. In aspects, only one larger slot 204B and only one smaller slot 206B may be present.

Access member 200C generally includes walls 202C, 204C and opening 206C. The walls 202C, 204C are formed from a lip or series of lips, which protrude from a rear portion of the outer wall 204A of the retain member 200A, surrounding the opening 206C. The walls 202C, 204C may protrude outward at a 90-degree angle from the retain member 200A. As best shown in FIG. 6, the access member 200C may include four inner walls 202C and four outer walls 204C, forming and/or bordering a square shaped opening 206C. Other configurations are envisioned (e.g., a single circular wall forming a circular opening, or walls forming a rectangular-shaped opening). Multiple access members 200C may be formed in retain member 200A. Generally, the access member 200C is formed in a centered, bottom portion of the retain member 200A, although alternative placements for the access member 200C are envisioned, such as on one or more sides of the retain member 200A. In aspects, multiple access members 200C may be present, in varying shapes and/or sizes.

The access member 200C is formed in the retain member 200A, with opening 206C providing access for a feeding animal to smell and/or make contact with the user (e.g., the user's hand/palm). Generally, the access member 200C creates a suction around the hand of the user, forming a tight seal between the user's hand and the retain member 200A. The tight seal will create a barrier between the retain member 200A and the user's hand, which enables food and/or water to remain within the retain member 200A and reduces/restricts the free flow of the food and/or water through the opening 206C. In doing so, access member 200C acts as a part of retain member 100A to hold food and/or water. In aspects, access member 200C may be treated as a separate compartment of retain member 200A, wherein one item (e.g., water or wet food) may be placed within the resulting compartment of access member 200C, and another item (e.g., dry food) may be placed in the remaining, upper portion of the retain member 200A. In doing so, the two different items may remain separated within access member 200A, preventing them from mixing them together.

In aspects, an inner surface of the access member 200C may have a raised surface and/or edge 208C, which can create an additional level of separation/compartmentalization within access member 200C. In aspects, grooves and/or striations 206A may be formed on the inner surface 202A of the retain member 202A, which can further assist in maintaining the above-discussed separation and prevent food from sliding out of the retain member 200A.

In aspects, the opening 206C of the access member 200C may have a protective member (not shown) such as a mesh screen, filter, or other device. The protective member may be made of chicken wire or a mesh-like material, although other materials are contemplated. The protective member serves to add an additional layer of protection and/or retention for the user. For example, the user could expose their hand to the animal with a shield to prevent biting, which may also assist in preventing pieces of food from exiting the opening 206C.

In aspects, the retain member 200A, fastener member 200B, and/or access member 200C may be formed from a silicone or a rubber-like material, which can further enhance the seal between the support system 200 and the user's hand. Alternative materials, such as plastics and polymer/plastic composites, are also contemplated. In aspects, the access member 100C may include an adhesive. The access member 100C may be lined with a rubber O-ring gasket or a rubber O-ring sleeve to further seal the contents of the retain member 100A. In aspects, the support system 200 may be formed from a flexible material to accommodate various sizes/shapes of appendages. In aspects, the retain member 100A and/or the access member 300C may be formed from a metal, such as stainless steel. In doing so, the retain member 100A and/or the access member 300C may be dishwasher compatible.

In aspects, the access member 200C may be configured in the shape of/include a plug or stopper (not shown). The access member 200C may be formed from silicone, plastic, cork, polymer/plastic composites, or another durable and/or flexible material. This plug configuration may assist in preventing food and/or water from exiting the retain member 200A, and/or allowing the user to place their hand on a different portion of the support system In aspects, the plug may be a separate component from the access member 200C and/or designed to have a mating configuration with the access member 200C.

Figure 7:
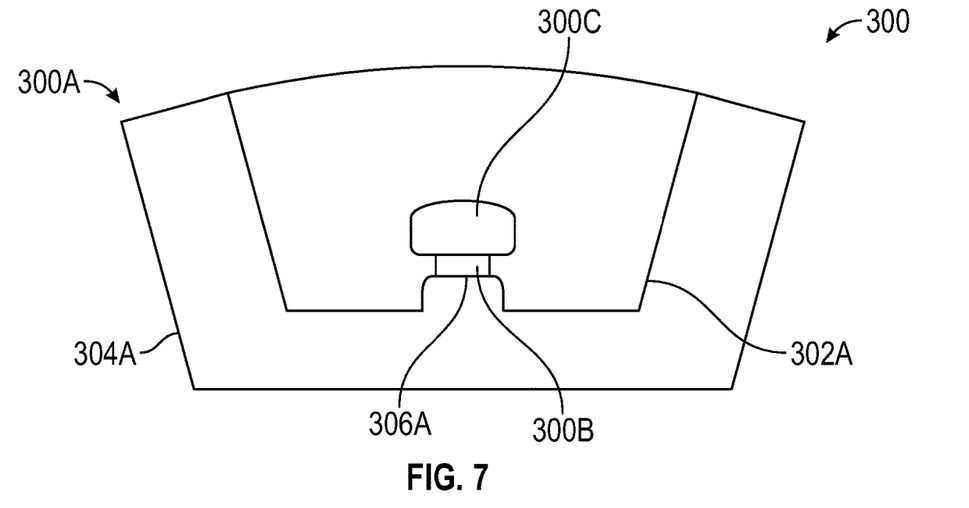
FIG. 7 is a side sectional view of an exemplary support system, in accordance with aspects of the present disclosure.

Now referring to FIG. 7, a support system 300 is shown. The support system 300 generally includes a retain member 300A, an access member 300B, and a consume member 300C.

The retain member 300A may have an inner surface 302A and an outer surface 304A. Generally, the retain member 300A may mimic the shape of a bowl, such as a dog food bowl, used for feedings. In aspects, the shape of retain member 300A may differ based on the intended use, such as a shape that is more ergonomic for the user or animal (e.g., flat plate, square, shaped container, etc.). The retain member 300A may hold water/food, treats, medicine, etc. within the support system 300 for consumption by a living being (e.g., an animal). Generally, the retain member 300A is formed from a rigid plastic or polymer/plastic composite, although other materials such as rubber or silicone are contemplated. In aspects, the retain member 300A may include protective member(s) (not shown) to protect the hand/fingers of the user. The protective member(s) are generally formed as tabs extending from the sides of the retain member 300A, which shield the fingers of a user when holding the retain member 300A. The protective members may be formed from the same material and/or a different material from the retain member 300A.

The access member 300B is configured for insertion into an opening 306A of the retain member 300A. Generally, the access member 300B is located on a bottom portion of the inner surface 302A of the retain member 300A, although alternative configurations are contemplated. In aspects, the opening 306A and the access member 300B may be formed with matching threads (not shown). The opening 306A may be configured to receive the access member 300B. For example, the access member 300B may be screwed into the opening 306A. Generally, the access member 300B is formed from the same material as the retain member 300A, but they may also differ in composition. For example, the access member 300B and/or retain member 300A may be formed from a rigid plastic or polymer/plastic composite, although other materials such as rubber or silicone are contemplated. In aspects, the access member 300B and/or the retain member 300A may be formed from a metal, such as stainless steel. In doing so, the support system 300 may be dishwasher compatible. The access member 300B may be attached to the opening 306A using a non-toxic, animal-friendly adhesive, such as honey, peanut butter, etc., although other products and/or methods of attachment are envisioned.

The consume member 300C is an item removably coupled/attached to the access member 300B. Generally, the consume member 300C is a food item used to entice an animal to use the support system 300 (e.g., to encourage the animal to eat/drink from the bowl). For example, the consume member 300C may be a treat, ball of food, flavor cake/pouch, or other product that emits a scent/flavor. Other items, such as toys and scent packets are contemplated and within the scope of this disclosure. In aspects, the consume member 300C may also be attached to the access member 300B using a non-toxic, animal-friendly adhesive (e.g., peanut butter or honey).

In use, the consume member 300C is first placed on the access member 300B. For example, a treat is affixed to the access member 300B using peanut butter. Next, the access member 300B is attached to the opening 306A, similarly using peanut butter. Next, an additional item for consumption by the animal (e.g., food or water) may fill the remainder of the retain member 300A. In doing so, the flavor and/or scent of the consume member will spread to the contents of/emit from the retain member 300A, enticing the animal to use the support system 300. For example, any water placed into the retain member 300A on top of the consume member 300C will absorb the scent and/or flavor of the consume member 300C. This may encourage the dog to drink the water from the retain member 300A, where they would normally not have to desire/curiosity to do so. Continued use of support system 300 may condition the animal to drink fluids and/or eat from a bowl generally, as they desire to retrieve the consume member 300C at the bottom of the retain member 300A.

Figure 8:
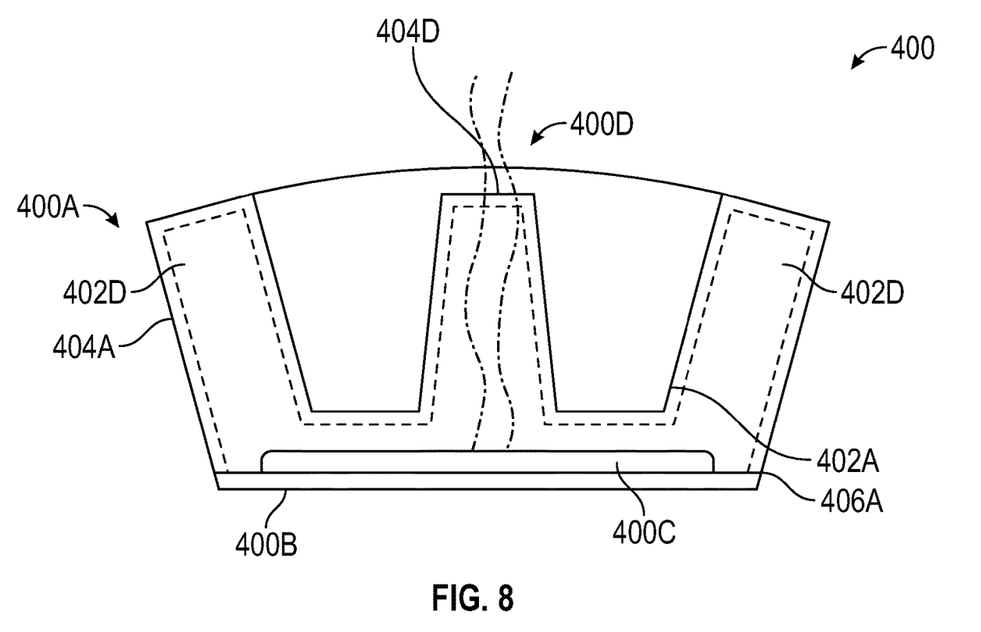
FIG. 8 is a side sectional view of an exemplary support system, in accordance with aspects of the present disclosure.

Now referring to FIG. 8, a support system 400 is shown. The support system 400 generally includes a retain member 400A, a base member 400B, a consume member 400C, and an emit member 400D. The retain member 400A may have an inner surface 402A and an outer surface 404A. Generally, the retain member 400A may mimic the shape of a bowl, such as a dog food bowl, used for feedings. The retain member 400A may hold water/food, treats, medicine, etc. within the support system 400 for consumption by a living being (e.g., an animal). Generally, the retain member 400A is hollow internally and formed from a rigid plastic or polymer/plastic composite, although other materials such as rubber or silicone are contemplated. For example, the retain member 400A may be shaped similar to a bundt cake pan. In aspects, the shape of retain member 400A may differ based on the intended use, such as a shape that is more ergonomic for the user or animal (e.g., flat plate, square, shaped container, etc.). In aspects, the retain member 400A may include protective member(s) (not shown) to protect the hand/fingers of the user. The protective member(s) are generally formed as tabs extending from the sides of the retain member 400A, which shield the fingers of the user when holding the retain member 400A. The protective members may be formed from the same material or a different material from the retain member 400A.

The base member 400B may be a plate for holding a consume member 400C. The consume member 400C may be a treat, ball of food, flavor cake/pouch, scent packet, or other product, which emits an enticing scent/flavor. In aspects, the consume member 400C may simply be a thin layer of dog food or animal-friendly adhesive (peanut butter). Generally, the base member 400B may be positioned underneath the retain member 400A. The base member 400B is typically the same size/shape as the bottom of the retain member 400A, in order to completely enclose a bottom opening 406A of retain member 400A. In aspects, inserting the base member 400B into the bottom opening 406A may form a fluid tight/vacuum seal with retain member 400A The base member 400B may be formed from a rigid plastic or polymer/plastic composite, although other materials such as rubber, silicone, or metals are contemplated.

As pictured, the base member 400B may maintain a flat surface, but in aspects the base member 400B may contain an indentation (not shown) formed on its surface to prevent movement of the consume member 400C placed thereon. In aspects, the base member 400B may be attached to the consume member 400C by a non-toxic, animal-friendly adhesive, such as honey, peanut butter, etc., although other products and/or methods of attachment are envisioned. In doing so, the consume member 400C acts like a scented gel packet, which gives off a strong odor that is enticing to an animal. In aspects, multiple consume members 400C may be affixed to the base member 400B (e.g., like dog food "nuggets"), which may be half/fully coated in the adhesive. In aspects, base member 400B may be a weighted bar or O-ring, which sinks to the bottom of the retain member 400A and includes a consume member 400C. Once the water/food and/treats are consumed, the base member 400B may be used as a toy.

The emit member 400D generally includes channels 402D and a top opening 404D. The channels 402D include the hollow inside of the retain member 400A, allowing a scent of the consume member 400C to travel out from the base member 400B and through the top opening 404D. In aspects, an additional consume member 400C (e.g., a scent packet) may be placed on/below the surface of the top opening 404D to further enhance the effect of the scent. For example, a food item may be placed on base member 400B and a scent packet to enhance the smell may be placed below the top opening 404D.

In use, the consume member 400C is first placed on the base member 400B. For example, a treat is affixed to the base member 400B using peanut butter. Next, the base member 400B is attached to the bottom opening 406A, creating a tight seal. Next, an additional item for consumption by the animal (e.g., food or water) may fill the remainder of the retain member 400A. Then, the scent of the consume member 400C will travel through the channels 402D and exit out of the top opening 404D, enticing the animal to use the support system 400. For example, while smelling the scent of the consume member 400C, the dog may want to drink the water from the retain member 400A, where they would normally not have to desire/curiosity to do so. Continued use may condition the animal to drink for fluids and/or eat from a bowl generally, as they desire to retrieve the consume member 400C, which they smell at the bottom of the retain member 400A.

Figure 9:
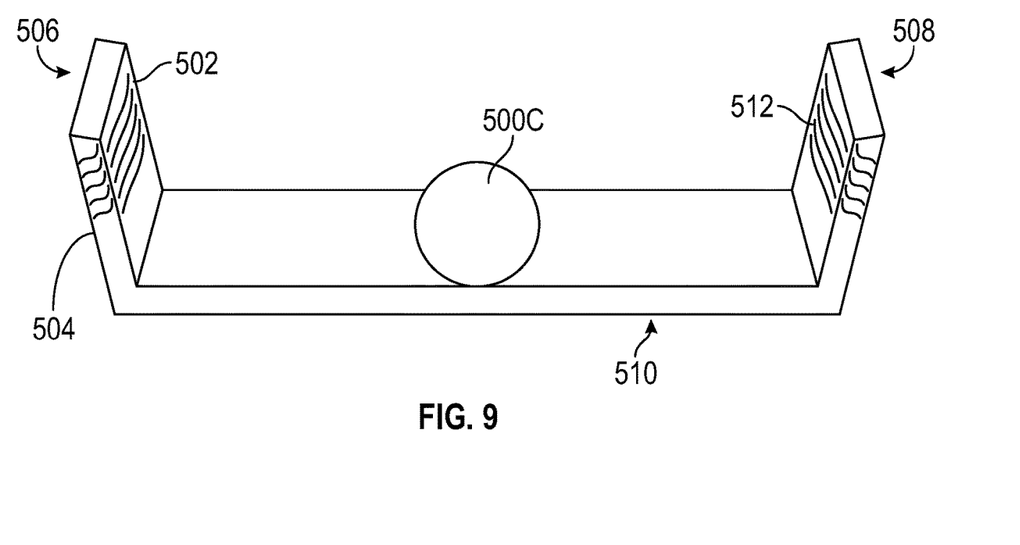
FIG. 9 is a top perspective view of an exemplary application member, in accordance with aspects of the present disclosure.

Now referring to FIG. 9, an application member 500 is shown. The application member 500 generally includes an inner surface 502, an outer surface 504, legs 506, 508, and base 510. Application member 500 may be a U-shaped device, which is configured to align with the inside of support systems 100, 200, 300 or 400, and/or 600. For example, application member 500 may be configured to fit snugly against the inside surface 102A of retain member 100A. In aspects, the application member may consist of a handle (not shown) and one or more legs 506, 508. The application member 500 may be formed from a rigid plastic or polymer/plastic composite, although other materials such as rubber or silicone are contemplated.

Generally, a consume member 500C is attached to application member 500. The consume member 500C may be a treat, ball of food, flavor cake/pouch, scent packet, or other product, which emits an enticing scent/flavor. As pictured, the consume member 500C may be placed on the base 510 and/or on the legs 506, 508 of the application member 500, although alternative placements are possible. The base 510 may contain an indentation (not pictured) to prevent movement of the consume member 500C. The legs 506, 508 may contain indentations/striations 512, which may facilitate housing of a consume member 500C (e.g., wet food or scented product). In aspects, the application member 500 may be attached to the support system 100, 200, 300, 400, 600, and/or the consume member 500C using a non-toxic, animal-friendly adhesive, such as honey, peanut butter, etc., although other adhesion methods are envisioned.

In aspects, application member may contain a scented oil, gel, crayon, spray or powder-like solution, which can be applied to member(s) of the support system 100, 200, 300, 400, 600. Scented pads, such as cotton pads or strips (not shown) may be attached to legs 506, 508 to further retain an intended scent. For example, the user may use the application member 500 to rub a scent onto the outer surface of a retain member.

In use, a consume member 500C is generally first placed on the application member 500. For example, a treat is affixed to the base 510 using peanut butter and the legs 506, 508 are dipped in a scented oil. Next, the application member 500 is placed inside of a support system 100, 200, 300, 400, 600. For example, application member is affixed to the inner surface 102A of retain member 100A. using peanut butter. Then, an additional item for consumption by the animal (e.g., food or water) may fill the remainder of the retain member 100A. In doing so, the scent of the consume member 500C will permeate through the food/water, enticing the animal to use the support system. For example, the scent and/or flavor may be a favorite of the animal. Further, the sight of the application member 500 may also entice the animal to want to eat/drink to reach the application member (e.g., shaped like a favorite toy). For example, while smelling the scent of the consume member 100C, the dog may want to drink the water/eat the food from the retain member 100A, where they would normally not have to desire/curiosity to. Continued use may condition the animal to drink for fluids and/or eat from a bowl generally, as they desire to retrieve the consume member 100C, which they smell on the application member 500.

Figure 10:
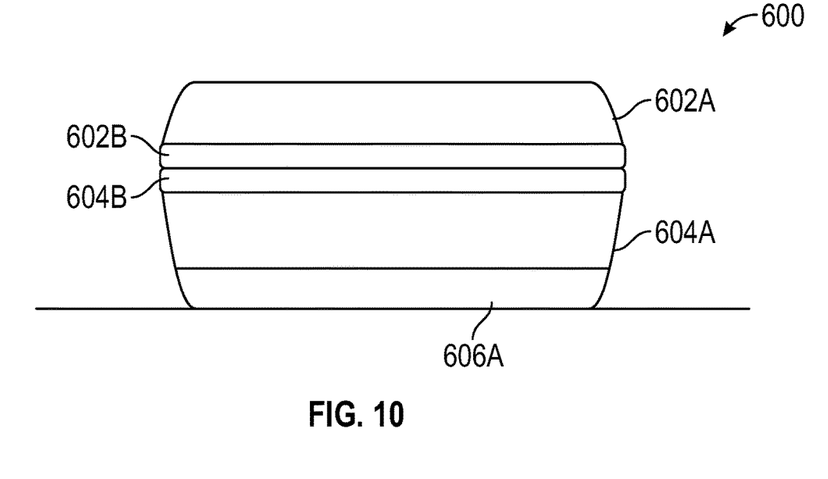
FIG. 10 is a side sectional view of an exemplary support system, in accordance with aspects of the present disclosure.

Now referring to FIG. 10, a portable support system 600 is shown. The portable support system 600 generally includes two retain members 602A, 604A, each attached to a cover member 602B, 604B. The joined retain members and cover members may be stacked (e.g., two cover members joined at the center) to allow for easy transportation. In aspects, the cover members 602B, 604B may each have a threaded surface (not shown), such that the two may be screwed together. However, other sealing methods such as clasps, clamps, and indentations are contemplated. The cover members 602B, 604B may include small openings (not shown) from which a scent may emit.

At least one retain member 602A, 604A (e.g., retain member 604) may include a base 606A, which may house a consume member 600C affixed using an adhesive in a manner similar to those described above. For example, the top retain member 602A may contain water, while the bottom retain member 604A may include a treat affixed with peanut butter to a bottom of the base member 606A, which is then covered by dry food. The cover members 602B, 604B may be removed one at a time, so that the animal can focus on eating and/or drinking separately if needed. In aspects, the retain members 602A, 604A may be disposable, such that the cover member 602B, 604B are interchangeable with different retain members for transportation on the go. For example, a user may bring disposable retain members 602A, 604B when taking their dog for a walk, which they can open when reaching their destination. After use, they may be disposed of and new retain members may be used. In aspects, the covers 602B 604B may be configured to fit around other support systems 100, 200, 300, 400.

Other variations/configurations of the above support systems are envisioned. For example, in one support system, a retain member may be adapted to fit and/or screw into a throw member (not shown). The throw member can act like a cover on-the-go, similar to portable support system 600. This may then have the added benefit of use as a frisbee or throw toy. In doing so, a user could serve their dog food/water and/or detach the throw member and play catch with the animal. In aspects, the throw member may contain additional members, such as a handle member on top/on the side of the throw member. The handle member may be a U-shaped piece of plastic or silicone, although other shapes and materials are envisioned, such as those more ergonomic to a user's hand. The throw member may be configured to hold a stick, a toy, application member, and/or a consume member, which will entice the dog to play with the throw member. For example, the treat could emit an enticing scent across the air, which stimulates the animals when the user throws the frisbee for the animal to pick up.

In another example, a support system can be built into a dog walking leash handle (not shown), which may attach to a cord, chain, and/or rope for walking a dog. The support system may include an application member with a consume member, a cover member, a retain member, and/or a throw member. The application member can be used to apply a scent to the throw member, the cover member, a retain member, a toy, and/or another member of the support system. Another application member/pad may be inserted or built into the dog walking leash handle. In aspects, the consume member may be placed on the application member and/or the throw member. The cover member may include small openings from which a scent may emit.

In a further example, a support system may be formed in the shape of a glove (not shown) to fit onto a user's hand. The glove-like support system may include a retain member, a fastener member, an access member, and/or a consume member. The fastener member may be an elastic band, similar to that of a glove, which tightens the seal of the support system around the user's hand. Generally, the access member may be an opening within the retain member, which exposes the user's hand. The access member may be a single opening in the center of the glove-like structure, or an opening extending along the length of the user's hand in a U-shape. The access member may include a plastic or silicone border, forming a seal against the user's hand so that the access member functions as a retain member. A consume member may be placed within the retain member, e.g., within the walls of the glove-like structure, or within the borders of the access member. The close connection between the retain member and the user's hand may further entice and/or strengthen the bond between an animal and a user.

In still a further example, the support system could function as a large container, such as a large measuring cup (not shown). The support system may include a large retain member, a handle, and an access member. The large retain member may be suited for holding a large quantity of water, wet food, dry food etc., which may be helpful when feeding multiple/larger animals (e.g., horses or livestock). In aspects, the support system may be made of plastic, silicone, glass, etc. The handle may be affixed or formed from one side of the retain member, allowing the user to insert their hand underneath. The handle may include a rubber coating to strengthen the user's grip and/or tighten their seal around the access member. In aspects, the handle may also vary in size/shape to enhance the grip/seal of the user. The access member may be formed on the same side of the retain member as the handle, exposing a portion of the user's hand to the feeding animal.

As discussed above, a consume member may be a scented gel. To generally make a scented gel, a user may slowly place approximately two tbsp of gelatin into a pot with approximately one cup of room temperature water, then allow the mixture to swell/balloon. After about five-fifteen minutes, the gelatin will balloon and begin to dissolve. Then, the pot can be removed from the heat and allowed to cool. The mixture may be placed into a Pyrex® or similar container (e.g., heat-resistant cup or bowl). Afterwards, about ¼ tsp of potassium sorbate can be added and stirred into the mixture. Then, about ½ cup of water can be added, followed by about ½ cup of vodka. An essential oil or scent solution can be added and mixed in, as well. The mixture can then be contained in a jar or pan and placed into the refrigerator for approximately three hours. To complete, the jar or pan can be covered with frog lids until ready to use. Another scented device that could be used with and/or in addition to the scented gel described is a cloth or pad with an oil or ingredient added to it. The oil or solution may be vanilla, coconut, ginger, niaouli, chamomile, helichrysum, peppermint, eucalyptus, etc. or another scent that could provide various benefits to animals such as dogs when they smell it.

The support systems and disclosed members/devices are not limited to the items listed. Each element, arrangement, configuration, component, and member of the embodiment is not limited to the configuration(s), composition(s), purpose(s), or arrangement(s) described. This embodiment and its elements are not limited to what had been described. The program(s), embodiment(s), processes, configurations, benefits, etc. are not limited to what has been described. The embodiment and its members are not limited to what has been described.

While the embodiment has been described with a certain degree of particularity, it should be recognized that elements thereof may be altered by persons skilled in the art without departing from the spirit and scope of the embodiment. Accordingly, the present embodiment is not intended to be limited to the specific forms set forth herein, but on the contrary, it is intended to cover such alternatives, modifications and equivalents as can be reasonably included within the scope of the disclosure.

The definition or description of each member or component is not limited to what has been listed in this specification. The system is not limited to use as a bowl and can readily embody other devices and/or configurations. For example, the embodiment is not limited to use with dogs and can be readily used with other animals, being or entities, such as those who consume food or water. Further, the materials used in the embodiment are not limited to what has been described and other materials can readily be employed. Furthermore, the benefits listed are not limited, as the system could provide additional benefits and uses.

Although the present embodiment has been described in considerable detail with reference to certain preferred versions thereof, other versions would be readily apparent to those of ordinary skill in the art. These aspects of the system are not meant to be exclusive. Furthermore, some features may apply to certain versions of the invention, but not others. Other features, aspects, and advantages of the present embodiment will be readily apparent to those of ordinary skill in the art when read in conjunction with the following description and accompanying drawings. Therefore, the spirit and scope of the appended claims should not be limited to the description of the preferred versions contained herein.

What is claimed is:

1. A feeding support system, comprising:
   a bowl-shaped housing including an upper surface and a lower surface opposing the upper surface, the upper surface configured to retain at least one item for consumption by an animal;
   an attachment arm distributed along a length of the bowl-shaped housing, the attachment arm configured to affix the lower surface of the bowl-shaped housing to an appendage of a user;
   at least one handle extending from the bowl-shaped housing, the at least one handle defining an elongate slot for receiving an end portion of the attachment arm; and
   an aperture defined in the lower surface of the bowl-shaped housing, the aperture configured to expose a first portion of the appendage of the user to the animal, wherein the lower surface is configured to shield a second portion of the appendage of the user when the appendage is affixed thereto.

2. The feeding support system of claim 1, wherein the aperture defines a square-shaped opening configured to enhance an ergonomic feature of the bowl-shaped housing for the appendage of the user.

3. The feeding support system of claim 1, further comprising a hook to enable adjustment of a length of the attachment arm.

4. The feeding support system of claim 1, wherein the attachment arm is positioned beneath the lower surface of the bowl-shaped housing.

5. The feeding support system of claim 1, further comprising a protective member covering at least a portion of the aperture, the protective member including at least one of a mesh screen, a filter, or chicken wire.

6. The feeding support system of claim 1, further comprising a plug configured to selectively seal the aperture to retain the at least one item within the upper surface of the bowl-shaped housing.

7. The feeding support system of claim 1, wherein the aperture includes an outwardly protruding lip configured to form a water-tight seal against the second portion of the appendage of the user.

8. The feeding support system of claim 7, wherein the bowl-shaped housing is fabricated from at least one of a silicone or rubber configured to enhance the water-tight seal of the outwardly protruding lip against the second portion of the appendage of the user.

9. The feeding support system of claim 7, wherein the outwardly protruding lip includes at least one of an adhesive, a rubber O-ring gasket, or a rubber O-ring sleeve configured to enhance the water-tight seal of the outwardly protruding lip against the second portion of the appendage of the user.

10. The feeding support system of claim 1, wherein the at least one handle includes first and second handles extending from diametrically opposed sides of the bowl-shaped housing.

11. The feeding support system of claim 10, wherein the attachment arm includes a coupling mechanism configured to couple a first side of the attachment arm to a second side of the attachment arm, and wherein the attachment arm is permanently affixed to the first handle and releasably coupled to the second handle by the coupling mechanism.

12. The feeding support system of claim 11, wherein the coupling mechanism includes at least one of hook-and-pile fasteners, buttons, or clasps.

13. A feeding support system, comprising:
- a bowl-shaped housing including an upper surface and a lower surface opposing the upper surface, the upper surface configured to retain at least one item for consumption by an animal;
- an attachment arm distributed along a length of the bowl-shaped housing, the attachment arm configured to affix the lower surface of the bowl-shaped housing to an appendage of a user;
- at least one handle extending from the bowl-shaped housing, the at least one handle defining an elongate slot for receiving an end portion of the attachment arm; and
- a central aperture defined in the lower surface of the bowl-shaped housing, the central aperture configured to expose a first portion of the appendage of the user to the animal, wherein the lower surface of the bowl-shaped housing is configured to shield a second portion of the appendage of the user when the appendage is affixed thereto, and wherein the central aperture includes an outwardly protruding lip configured to interface with the second portion of the appendage of the user.

14. The feeding support system of claim 13, wherein the outwardly protruding lip is configured to form a water-tight seal against the second portion of the appendage of the user.

15. The feeding support system of claim 13, further comprising a hook to enable adjustment of a length of the attachment arm.

16. The feeding support system of claim 13, wherein the at least one handle includes first and second handles extending from diametrically opposed sides of the bowl-shaped housing.

17. The feeding support system of claim 16, wherein the attachment arm includes a coupling mechanism configured to couple a first side of the attachment arm to a second side of the attachment arm, and wherein the attachment arm is permanently affixed to the first handle and releasably coupled to the second handle by the coupling mechanism.

18. A feeding support system, comprising:
- a bowl-shaped housing including an upper surface and a lower surface opposing the upper surface, the upper surface configured to retain at least one item for consumption by an animal;
- an attachment arm distributed along a length of the bowl-shaped housing, the attachment arm configured to affix the lower surface of the bowl-shaped housing to hand of a user;
- first and second handles extending from diametrically opposed sides of the bowl-shaped housing, the first and second handles defining elongate slots for receiving an end portion of the attachment arm; and
- a central aperture defined in the lower surface of the bowl-shaped housing, the central aperture configured to expose a palm of the hand of the user to the animal, wherein the lower surface of the bowl-shaped housing is configured to shield at least one finger of the hand of the user when the hand is affixed thereto, wherein the central aperture includes an outwardly protruding lip configured to form a water-tight seal against the palm of the hand of the user, and
- wherein the bowl-shaped housing, the first and second handles, and the central aperture are formed from a single component.

19. The feeding support system of claim 18, wherein the attachment arm includes a coupling mechanism configured to couple a first side of the attachment arm to a second side of the attachment arm, and wherein the attachment arm is permanently affixed to the first handle and releasably coupled to the second handle by the coupling mechanism.

20. The feeding support system of claim 18, further comprising a hook to enable adjustment of a length of the attachment arm.

* * * * *